March 29, 1966     F. A. SHERWOOD     3,243,175
TORSION SPRING ATTACHMENT MEANS
Filed March 18, 1964

INVENTOR.
Frank A. Sherwood
BY
W. F. Wagner
ATTORNEY

United States Patent Office 3,243,175
Patented Mar. 29, 1966

3,243,175
TORSION SPRING ATTACHMENT MEANS
Frank A. Sherwood, Warren, Mich., assignor to General Motors Corporation, Detroit, Mich., a corporation of Delaware
Filed Mar. 18, 1964, Ser. No. 352,888
4 Claims. (Cl. 267—57)

This invention relates to springs and more particularly to improved means for attaching and anchoring torsion springs of polygonal cross section.

The use of torsion springs to provide the elastic medium in various applications is well known and has achieved wide application in certain fields. However, some of the benefits inherent in utilizing the torsional elasticity of such springs are offset due to the fact that twisting imparted to the spring in operation is abruptly resisted at the point while the spring enters the anchor or other attachment means at the opposite ends thereof. In practice, disruption of smooth transition of flexing induces stress concentrations which tend to cause premature fatigue failure. While various attempts have been made to reduce this effect, particularly with respect to torsion springs of round cross section, such solutions are generally not satisfactory in other forms of torsion springs, particularly the blade or leaf type. The present invention is concerned primarily with improving the performance and service life of torsion spring assemblies utilizing springs of the polygonal cross section, particularly those of square or rectangular cross section.

As used herein, the term "leaf type" is intended to mean springs of generally rectangular cross section as well as a plurality of similar rectangular leaves arranged in stacked relation.

An object of the present invention is to provide an improved torsion spring assembly.

Another object is to provide improved means for anchoring and otherwise operatively attaching opposite ends of leaf type torsion springs.

A further object is to provide a leaf spring anchor which enables maintenance of smooth transition in torsional deflection of the spring throughout its entire length including those portions enclosed within the anchor and operating attachment.

A still further object is to provide an anchor for a leaf type torsion spring which minimizes stress concentration.

These and other objects, advantages and features of the invention will become more readily apparent as reference is had to the accompanying specification and drawing wherein.

Figure 1:
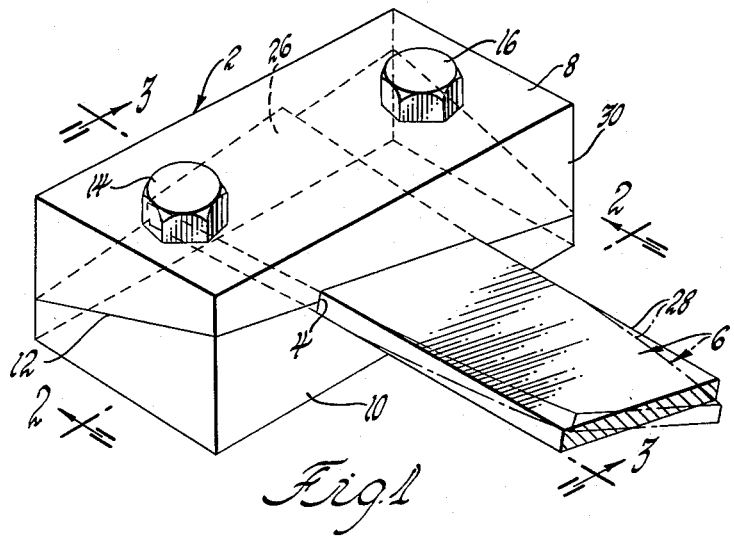
FIGURE 1 is a phantomized perspective view of a spring and anchor constructed in accordance with the invention, with the spring shown in solid lines under a no-load condition and in dotted lines in the normal static load condition.
Figure 2:
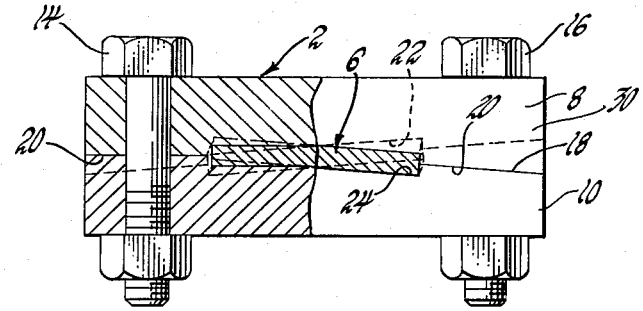
FIGURE 2 is a view looking in the direction of arrows 2—2 of FIGURE 1.
Figure 3:
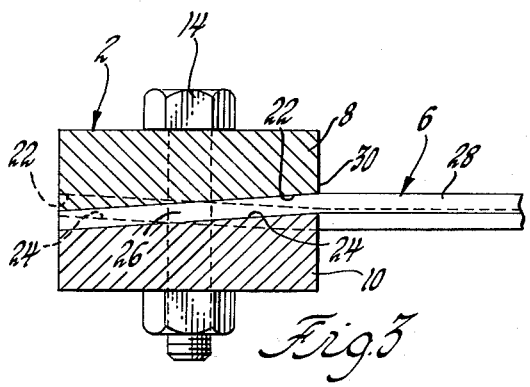
FIGURE 3 is a view looking in the direction of arrows 3—3 of FIGURE 1.

Referring now to the drawing and particularly FIGURE 1, reference numeral 2 generally designates a two-piece anchor block having a contoured socket 4 formed therein conforming in cross-sectional shape to the cross-sectional shape of a leaf type torsion spring 6. Anchor block 2 comprises upper and lower halves 8 and 10 which are separated by a contoured parting line 12 determined in a manner shortly to be described. In assembled relation, the halves 8 and 10 and blade spring 6 are retained in assembled relation by bolts 14 and 16. It will be understood that block 2 will ordinarily be secured to a vehicle or structure, not shown.

According to the invention, the contour of socket 4 formed in anchor block 2 is established by determining the normal helical path defined by a free portion of spring 6 under a predetermined torsional loading equal to the static loading which the spring is to be subjected under normal operating conditions. The separate halves 8 and 10 are then contour milled to form opposing mating surfaces 18 and 20 which conform to this helical path. The opposing halves 8 and 10 are then additionally formed with similarly contoured recess portions 22 and 24 of width corresponding to the width of spring 6. As a result, when the two mating halves 8 and 10 and the confined portion 26 of spring 6 disposed therebetween are subjected to clamping pressure by bolts 14 and 16, the portion 26 is permanently clamped in a helical configuration corresponding to the helical path which the free portion 28 of the spring will assume when the normal static load is applied. Therefore, since the entire length of spring 6, including the confined portion 26, will exhibit uniform deflection transition under static loading, the slight opposite torsional deflection of portion 28 incident to operation will produce minimal interruption of deflection transition and thus substantially reduce stress concentration or fretting corrosion in the portion of the spring immediately adjacent the forward face 30 of anchor 2.

It will be understod that the foregoing reference to the use of contour milling in order to achieve the configuration desired is not to be considered by way of limitation of the invention, since it is evident that various well known techniques, such as casting, molding, forging, etc., may be utilized in achieving the shape desired. In addition, in certain instances it may be desirable to fabricate the anchor members from material exhibiting moderate elastic and/or lubricating characteristics, such as for example nylon, Delrin, and Teflon. It should also be understood that the opposite end of the spring, not shown, will normally be provided with an operative member or lever, not shown, having a contoured socket similar to socket 4.

While but one embodiment of the invention has been shown and described, it will be apparent that numerous changes and modifications may be made therein. It is, therefore, to be understood that it is not intended to limit the invention to the embodiment shown, but only by the scope of the claims which follow.

I claim:

1. In combination, a torsion spring of polygonal cross section, an anchor member having a socket formed therein adapted to receive one end of said spring, said socket being formed in cross section to conform with the cross-sectional shape of said spring and further being generated in a generally helical path corresponding to the torsional deflection of the spring under normal static load.

2. In combination, a leaf type torsion spring, an anchor member having a socket formed therein adapted to receive one end of said spring, said socket being formed in cross section to conform with the cross-sectional shape of said spring and further being generated in a generally helical path corresponding to the torsional deflection of the spring under normal static load.

3. In combination, a leaf type torsion spring, an anchor member having a socket formed therein adapted to receive one end of said spring, said socket being formed in cross section to conform with the cross-sectional shape of said spring and further being generated in a generally helical path permanently retaining that portion of the spring contained therein in torsional deflection corresponding to the torsional deflection of the free end of the spring under normal static load.

4. In combination, a leaf type torsion spring, a member having a socket formed therein adapted to receive either end of said spring, said socket being formed in cross section to conform with the cross-sectional shape of said spring and further being generated in a generally helical path permanently retaining that portion of the spring contained therein in torsional deflection corresponding to the torsional deflection of the free end of the spring under normal static load.

References Cited by the Examiner

UNITED STATES PATENTS

| | | | |
|---|---|---|---|
| 2,238,380 | 4/1941 | Almen | 267—57 |
| 3,181,883 | 5/1965 | Kolbe | 267—57 X |

ARTHUR L. LA POINT, *Primary Examiner.*

W. B. WILBER, *Assistant Examiner.*